E. Davidson.
Cotton Bale Tie.
N° 24,995.      Patented Aug. 9, 1859.
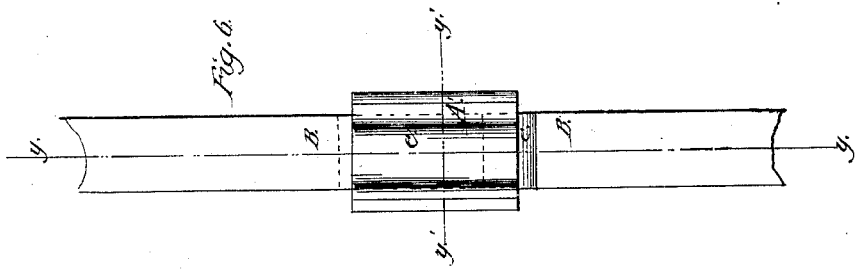
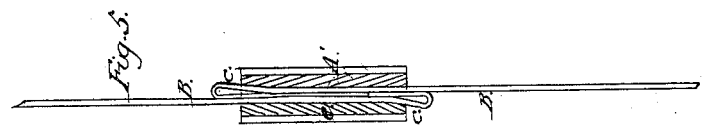
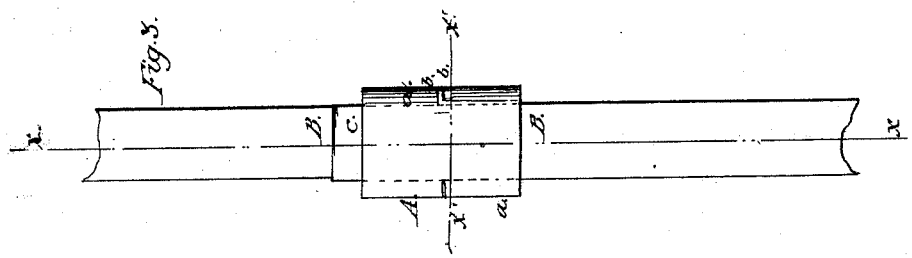
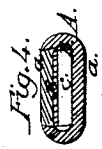
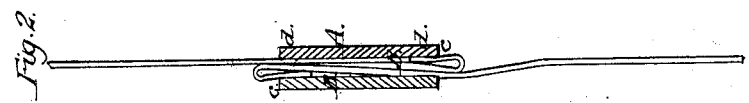
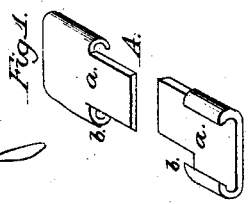

UNITED STATES PATENT OFFICE.

EDWARD DAVIDSON, OF BATESVILLE, ARKANSAS.

IMPROVEMENT IN HOOP-FASTENINGS FOR COTTON-BALES, &c.

Specification forming part of Letters Patent No. 24,995, dated August 9, 1859.

*To all whom it may concern:*

Be it known that I, EDWARD DAVIDSON, of Batesville, in the county of Independence and State of Arkansas, have invented a new and Improved Hoop-Lock for Securing together the Ends of Bale-Hoops; and I do hereby declare that the following is a full, clear, and exact description of the same, reference being had to the annexed drawings, making a part of this specification, in which—

Figure 1 is a detached perspective view of my invention. Fig. 2 is a central longitudinal section of the same applied to the ends of a bale-hoop and connecting them together, $x\ x$, Fig. 3, indicating the plane of section; Fig. 3, a face view of the same; Fig. 4, a transverse section of the same, taken in the line $x'\ x'$, Fig. 3; Fig. 5, a central longitudinal section of a modification of the invention illustrated in the preceding figures, $y\ y$, Fig. 6, indicating the plane of section; Fig. 6, a face view of the same; Fig. 7, a transverse section of the same, taken in the line $y'\ y'$, Fig. 6.

Similar letters of reference indicate corresponding parts in the several figures.

This invention consists in securing the ends of a bale-hoop together by means of a socket formed of two parts, and having the ends of the hoop bent or doubled and fitted in the socket by removing one part, and secured therein by adjusting the two parts of the socket together, the doubled ends of the hoop preventing the same from drawing through the socket, and thereby securing the hoop around the bale.

To enable those skilled in the art to fully understand and construct my invention, I will proceed to describe it.

A, Figs. 1, 2, 3, and 4, is a socket, which is formed of two parts, $a\ a$, as shown clearly in Fig. 1, said parts, when fitted together, forming a socket with parallel sides and rounded ends, the form being clearly shown by Figs. 3 and 4. The two parts $a\ a$ are fitted together with a dovetail joint, as shown clearly in Figs. 1, 3, and 4, and the ends $b\ b$ of the socket abut against each other, as shown in Fig. 3.

B B represent the ends of a bale-hoop. These hoops are of sheet-iron and their ends are bent or doubled, as shown clearly at $c$ in Figs. 2, 3, and 5. (See more particularly Fig. 2.) The ends of the socket A are of somewhat flaring form, as shown at $d$, so as to receive the inner parts of the doubled portions $c$ of the hoop.

From the above description it will be seen that the socket A may be readily applied to the ends of the hoop. The ends B of the hoop are doubled before being adjusted around the bale, and when the bale is fully compressed the ends B B are overlapped and fitted in one part $a$ of the socket, and the two parts $a\ a$ are then adjusted together. The hoops are adjusted around the bale in the usual manner, and their ends may be previously doubled by any suitable machine.

The doubling of the ends of bale-hoops and fitting the same in sockets to secure the ends together have been previously done; but so far as I am aware the sockets have been made entire and the ends of the hoops passed through the socket and their ends doubled while the hoops were on the bale, thus making the operation of applying the sockets a tedious one. By my invention this difficulty is fully obviated.

It is apparent that the gist of my invention consists in forming the socket A of two parts, or in such a way as to admit of the socket being opened to receive the doubled and lapped ends of the hoop, and then closed, or the two parts fitted together, so as to secure the two ends of the hoop together, and that the construction of the socket may be varied in various ways.

In Figs. 5, 6, and 7 the socket A' is shown provided with a taper slide, $e$, which extends its whole length, and which may be removed from or inserted in the main portion in order to effect the same result as the socket A.

I do not claim securing the ends of bale-hoops together by passing the same through a socket, and then doubling their ends to secure them in the socket, for this has been previously done; but I do claim as new and desire to secure by Letters Patent—

Forming the socket of two parts to admit of the same being opened to receive the bent or doubled and lapped ends of the bale-hoop and closed to secure the ends of the hoop together, substantially as and for the purpose specified.

EDWARD DAVIDSON.

Witnesses:
H. F. ARCHER,
JESSE SNOW.